(12) United States Patent
Li et al.

(10) Patent No.: US 10,638,423 B2
(45) Date of Patent: Apr. 28, 2020

(54) GROUP WAKE-UP AND KEEP-ALIVE INDICATION

(71) Applicant: Apple Inc., Cupertino, CA (US)

(72) Inventors: Guoqing Li, Cupertino, CA (US); Yong Liu, Campbell, CA (US); Oren Shani, Saratoga, CA (US); Xiaowen Wang, Cupertino, CA (US); Christiaan A. Hartman, San Jose, CA (US); Matthew L. Semersky, San Jose, CA (US); Josef Peery, Kadima (IL); Yoel Boger, Shoham (IL); Tushar R. Shah, Cupertino, CA (US); Rajneesh Kumar, Los Gatos, CA (US); Christian W. Mucke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 15/997,497

(22) Filed: Jun. 4, 2018

(65) Prior Publication Data

US 2018/0359704 A1 Dec. 13, 2018

Related U.S. Application Data

(60) Provisional application No. 62/517,817, filed on Jun. 9, 2017.

(51) Int. Cl.
*H04W 52/02* (2009.01)
*H04W 84/12* (2009.01)
*H04W 4/06* (2009.01)

(52) U.S. Cl.
CPC .......... *H04W 52/0219* (2013.01); *H04W 4/06* (2013.01); *H04W 52/0235* (2013.01); *H04W 84/12* (2013.01)

(58) Field of Classification Search
CPC ... H04W 4/06; H04W 52/0219; H04W 76/40; H04W 84/12; H04W 52/0235; H04W 52/02
(Continued)

(56) References Cited

U.S. PATENT DOCUMENTS 8,086,886 B2 * 12/2011 Schmidt ................ G06F 1/3209
713/323
9,730,162 B2 * 8/2017 Pujari ............... H04W 52/0235
(Continued)

FOREIGN PATENT DOCUMENTS

WO WO 2018/062905 A1 5/2018

OTHER PUBLICATIONS

Kim et al.: "WUR MAC issues follow-up"; IEEE 802.11-17/0381r0; Mar. 11, 2017; 20 pages.
(Continued)

*Primary Examiner* — Man U Phan
(74) *Attorney, Agent, or Firm* — Kowert Hood Munyon Rankin and Goetzel PC

(57) ABSTRACT

An interface circuit in an electronic device (such as an access point) may provide a group wake-up packet to a group of recipient electronic devices in a set of recipient electronic devices. During operation, the interface circuit may select the group in the set of recipient electronic devices, where the group includes at least one of the recipient electronic devices. Then, the interface circuit may provide the group wake-up packet for the recipient electronic devices in the group with information that specifies that a subset of the recipient electronic devices in the group transition from a low-power mode. For example, the information may include a bitmap that specifies the subset and an identifier of the group. Note that the electronic device may
(Continued)

dynamically define the group. Alternatively, the recipient electronic devices in the group may be static.

20 Claims, 9 Drawing Sheets

(58) Field of Classification Search
    USPC .......................................................... 370/311
    See application file for complete search history.

(56) References Cited

U.S. PATENT DOCUMENTS

| | | | |
|---|---|---|---|
| 9,736,779 B2* | 8/2017 | Min | H04W 52/0235 |
| 9,749,955 B2* | 8/2017 | Min | H04W 52/0229 |
| 9,801,157 B2* | 10/2017 | Merlin | H04W 68/02 |
| 9,826,482 B2* | 11/2017 | Park | H04W 52/0229 |
| 9,924,462 B2* | 3/2018 | Huang | H04W 52/0229 |
| 10,098,067 B2* | 10/2018 | Qi | H04W 76/14 |
| 10,182,400 B2* | 1/2019 | Khazanov | H04W 52/0235 |
| 10,194,394 B2* | 1/2019 | Huang | H04W 52/0235 |
| 2014/0086124 A1* | 3/2014 | Knowles | H04W 52/0277 370/311 |
| 2014/0120962 A1 | 5/2014 | Merlin | |
| 2015/0036576 A1* | 2/2015 | Jafarian | H04W 52/0212 370/311 |
| 2016/0373237 A1 | 12/2016 | Shellhammer | |
| 2017/0070959 A1 | 3/2017 | Khazanov | |
| 2017/0111858 A1* | 4/2017 | Azizi | H04W 52/0212 |
| 2018/0020405 A1* | 1/2018 | Huang | H04W 52/0229 |
| 2018/0077641 A1 | 3/2018 | Yang | |
| 2018/0092034 A1* | 3/2018 | Huang | H04W 52/0229 |
| 2018/0242250 A1* | 8/2018 | Huang | H04W 52/0229 |
| 2018/0255515 A1* | 9/2018 | Gupta Hyde | H04W 52/0235 |
| 2018/0376419 A1* | 12/2018 | Li | H04W 52/0222 |
| 2019/0014541 A1* | 1/2019 | Li | H04L 25/0202 |

OTHER PUBLICATIONS

Extended European Search Report, European Patent Application No. 18176364.0, dated Sep. 26, 2018, 35 pages.

* cited by examiner

GROUP WAKE-UP AND KEEP-ALIVE INDICATION

CROSS-REFERENCE TO RELATED APPLICATION

This application claims the benefit of U.S. Provisional Application No. 62/517,817, entitled "Group Wake-Up and Keep-Alive Indication, by Guoqing Li, et al., filed Jun. 9, 2017, the contents of which are hereby incorporated by reference.

FIELD

The described embodiments relate, generally, to wireless communications among electronic devices, and techniques for performing a group wake up of main radios in a subset of a group of recipient electronic devices.

BACKGROUND

Many electronic devices communicate with each other using wireless local area networks (WLANs), such as those based on a communication protocol that is compatible with an IEEE 802.11 standard (which is sometimes referred to as 'Wi-Fi'). However, a radio in an electronic device that communicates using wireless communication in a WLAN may consume a significant amount of power.

In order to address this challenge, a new radio technology called Low Power Wake Up Radio (LP-WUR) is being considered. The LP-WUR may be a companion to the main Wi-Fi radio in the electronic device. Notably, by using the LP-WUR, the electronic device may turn off its main radio and may wake up the main radio in response to the LP-WUR receiving an LP-WUR packet from an access point. For example, the access point may send the LP-WUR packet when there is a down-link packet for the electronic device.

SUMMARY

A first group of embodiments relate to an electronic device that provides a group wake-up packet. This electronic device may include a node that can be communicatively coupled to an antenna, and an interface circuit communicatively coupled to the node and that communicates with a set of recipient electronic devices. Notably, during operation, the interface circuit selects a group in the set of recipient electronic devices, where the group includes at least one of the recipient electronic devices. Then, the interface circuit provides the group wake-up packet for the recipient electronic devices in the group with information that specifies that a subset of the recipient electronic devices in the group transition from a low-power mode.

Note that the electronic device may include an access point. Moreover, the information may include a bitmap that specifies the subset. Furthermore, the information may include an identifier of the group.

Additionally, the group may be selected and the information may be based at least in part on pending traffic for the subset.

In some embodiments, the group wake-up packet includes a Low Power Wake Up Radio (LP-WUR) packet. For example, the group wake-up packet may be compatible with an IEEE 802.11 communication protocol.

Moreover, the interface circuit may define the group in the set of recipient electronic devices based at least in part on requests received from the recipient electronic devices in the group. Furthermore, the interface circuit may provide responses to the requests for the recipient electronic devices in the group, where a given response specifies an identifier of the group.

Furthermore, the group may be defined based at least in part on: wake-up intervals, specified in the requests, based at least in part on a duty cycle for LP-WURs in the recipient electronic devices in the group; keep-alive intervals, specified in the requests, that maintain connections with the electronic device; at least portions of identifiers of the electronic devices, and/or congestion in a wireless environment of the electronic device. Note that the interface circuit may dynamically define the group. Alternatively, the recipient electronic devices in the group may be static.

Additionally, the interface circuit may receive acknowledgments to the group wake-up packet that are associated the subset of recipient electronic devices in the group. Alternatively, the interface circuit may provide a trigger frame for the subset of recipient electronic devices in the group, and may receive a group acknowledgment to the group wake-up packet that is associated the subset of recipient electronic devices in the group.

Other embodiments provide an interface circuit in the electronic device.

Other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the interface circuit in the electronic device.

Other embodiments provide a method for providing a group wake-up packet. The method includes at least some of the aforementioned operations performed by the interface circuit in the electronic device.

A second group of embodiments relate to a recipient electronic device that receives a group wake-up packet. This recipient electronic device may include a node that can be communicatively coupled to an antenna, and an interface circuit communicatively coupled to the node and that communicates with an electronic device. The interface circuit may include a wake-up radio and a main radio. Notably, during operation, the wake-up radio receives the group wake-up packet associated with the electronic device with information that specifies that a subset of recipient electronic devices in a group of recipient electronic devices. When the information specifies the recipient electronic device, the wake-up radio provides, to the main radio, a wake-up signal that transitions the main radio from a low-power mode to a higher-power mode.

Note that the electronic device may include an access point. Moreover, the information may include a bitmap that specifies the subset. Furthermore, the information may include an identifier of the group.

Additionally, when the information does not specify the recipient electronic device, the wake-up radio may take no further action.

In some embodiments, the group wake-up packet includes an LP-WUR packet. For example, the group wake-up packet may be compatible with an IEEE 802.11 communication protocol.

Moreover, the main radio may provide a request for the electronic device with group requirements of the recipient electronic device. For example, the group requirements may include: a wake-up interval based at least in part on a duty cycle of the wake-up radio and/or a keep-alive interval that maintains a connection with the electronic device. Furthermore, the main radio may receive a response to the request, which is associated with the electronic device. This response may specify an identifier of the group.

Additionally, after transitioning to the higher-power mode, the main radio may provide an acknowledgment for the electronic device to the group wake-up packet. Alternatively, after transitioning to the higher-power mode, the main radio may receive a trigger frame for the subset of recipient electronic devices in the group, and may provide a group acknowledgment for the electronic device to the group wake-up packet, which is associated the subset of recipient electronic devices in the group.

Other embodiments provide an interface circuit in the recipient electronic device.

Other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the interface circuit in the recipient electronic device.

Other embodiments provide a method for receiving a group wake-up packet. The method includes at least some of the aforementioned operations performed by the interface circuit in the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
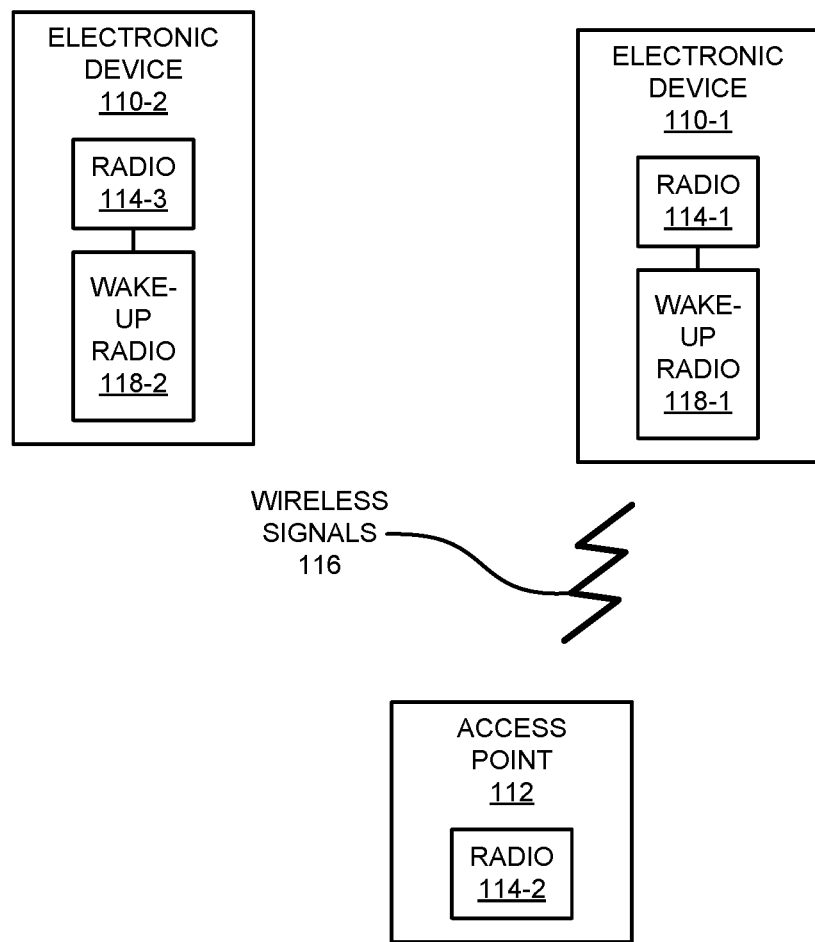
FIG. 1 is a block diagram illustrating an example of electronic devices communicating wirelessly.

An interface circuit in an electronic device (such as an access point) may provide a group wake-up packet to a group of recipient electronic devices in a set of recipient electronic devices. During operation, the interface circuit may select the group in the set of recipient electronic devices, where the group includes at least one of the recipient electronic devices. Then, the interface circuit may provide the group wake-up packet for the recipient electronic devices in the group with information that specifies that a subset of the recipient electronic devices in the group transition from a low-power mode. For example, the information may include a bitmap that specifies the subset and an identifier of the group. Note that the electronic device may dynamically define the group. Alternatively, the recipient electronic devices in the group may be static.

Moreover, the recipient electronic device may include another interface circuit that includes a wake-up radio (such as the LP-WUR) and a main radio. During operation, the wake-up radio may receive the group wake-up packet associated with the electronic device with information that specifies that the subset of recipient electronic devices in the group. When the information specifies the recipient electronic device, the wake-up radio may provide, to the main radio, a wake-up signal that transitions the main radio from a low-power mode to a higher-power mode. Alternatively, when the information does not specify the recipient electronic device, the wake-up radio may take no further action. For example, the wake-up radio may not transition the main radio from the low power mode to the higher-power mode.

By aggregating the recipient electronic devices into groups while allowing selective transitions by a specified subset of recipient electronic devices, this communication technique may reduce congestion in a medium in a wireless environment of the electronic device while maintaining the power savings associated with the use of the wake-up radio. Consequently, the communication technique may improve the communication performance and, thus, the user experience when using the electronic device or the recipient electronic device. Therefore, the communication technique may increase customer satisfaction and retention.

Note that the communication technique may be used during wireless communication between electronic devices in accordance with a communication protocol, such as a communication protocol that is compatible with an IEEE 802.11 standard (which is sometimes referred to as Wi-Fi). In some embodiments, the communication technique is used with IEEE 802.11BA and/or IEEE 802.11ax, which are used as illustrative examples in the discussion that follows. However, this communication technique may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 9, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-4, radio 114-1 may receive wireless signals 116 that are transmitted by radio 114-2. Alternatively, radio 114-1 may transmit wireless signals 116 that are received by radio 114-2. However, as described further below with reference to FIG. 5, radio 114-1 consumes additional power when operating in a higher-power mode. If radio 114-1 remains in the higher-power mode even when it is not transmitting or receiving packets, the power consumption of electronic device 110-1 may be needlessly increased. Consequently, electronic devices 110 may include wake-up radios 118 that listen for and/or receive group wake-up packets (and/or other wake-up communications) from access point 112 and then, when particular electronic devices 110 are specified in the group wake-up packets, wake-up radios 118 selectively wake up radios 114, i.e., provide wake-up signals that selectively transition radios 114 from a low-power mode to the higher-power mode.

During operation, access point 112 (such as radio 114-2) may select a group of recipient electronic devices in a set of recipient electronic devices (such as electronic devices 110), which includes at least one of electronic devices 110 (such as electronic devices 110-1 and 110-2). Then, radio 114-2 may provide a group wake-up packet (such as a LP-WUR packet) for the recipient electronic devices in the group with information that specifies that a subset of the recipient electronic devices in the group (such as electronic device 110-1) transition from the low-power mode. For example, the information may include an identifier of the group and/or a bitmap that specifies the subset. Thus, the bitmap may specify that electronic device 110-1 in the group transitions from the low-power mode. Note that the group may be selected and the information may be based at least in part on pending traffic for the subset, such as pending down-link traffic in access point 112 for electronic device 110-1.

After receiving the group wake-up packet, wake-up radio 118-1 may analyze the group wake-up packet to determine if the information specifies electronic device 110-1. When the information specifies electronic device 110-1, wake-up radio 118-1 may provide, to radio 114-1, a wake-up signal that transitions radio 114-1 from the low-power mode to the higher-power mode. Alternatively, when the information does not specify electronic device 110-1, wake-up radio 118-1 may take no further action, e.g., radio 114-1 may remaining in the low-power mode.

In some embodiments, radio 114-2 (and, more generally, access point 112) may define the group based at least in part on requests received from the recipient electronic devices in the group. For example, as described further below in FIG. 6, a request from electronic device 110-1 (which may be provided by radio 114-1 during the higher-power mode) may indicate: a wake-up interval (such as a wake-up interval between, e.g., 100 ms and 10 s, which may depend on whether or not a recipient electronic device is consuming media and, more generally, based at least in part on an application executing on the recipient electronic device), e.g., based at least in part on a duty cycle of wake-up radio 118-1; and a keep-alive interval (such as a keep-alive interval between, e.g., 1 and 10 s) that maintains a connection with access point 112. In some embodiments, the group is defined based at least in part on congestion in a wireless environment of electronic device 110-1. Thus, in a more congested environment, the group may include more recipient electronic devices, which reduces the congestion at the cost of increased power consumption by the recipient electronic devices in the group. Furthermore, radio 114-2 may provide responses to the requests for the recipient electronic devices in the group, where a given response specifies an identifier of the group that can be used by radios 118 when analyzing a LP-WUR packet. Note that radio 114-2 may dynamically define the group as the wireless environment changes (such as based at least in part on the number of electronic devices 110 in the wireless environment). However, in some embodiments, the group may be static, e.g., the group may be defined once by radio 114-2.

In these ways, the communication technique may allow electronic devices 110 and access point 112 to communicate efficiently (such as with low latency and high throughput) while significantly reducing the power consumption associated with radios 114 in electronic devices 110. These capabilities may improve the user experience when using electronic devices 110.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, as described further below with reference to FIG. 9, after providing the group wake-up packet, radio 114-2 may provide a trigger frame for the subset of recipient electronic devices in the group. This trigger frame may be provided after a time delay (such as a time delay between, e.g., 10 and 300 ms), so that radio 114-1 has sufficient time to transition to the higher-power mode. Moreover, after radio 118-1 receives the group wake-up packet and radio 114-1 transitions to the higher-power mode, radio 114-1 may provide a group acknowledgment to radio 114-2. For example, radio 114-1 may provide the acknowledgment during an assigned time slot and/or in an assigned channel in the group acknowledgment. However, in some embodiments the recipient electronic devices in the group may individually provide acknowledgments to radio 114-2. Thus, after radio 118-1 receives the group wake-up packet and radio 114-1 transitions to the higher-power mode, radio 114-1 (and, more generally, the main radios in the subset of the recipient electronic devices in the group) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
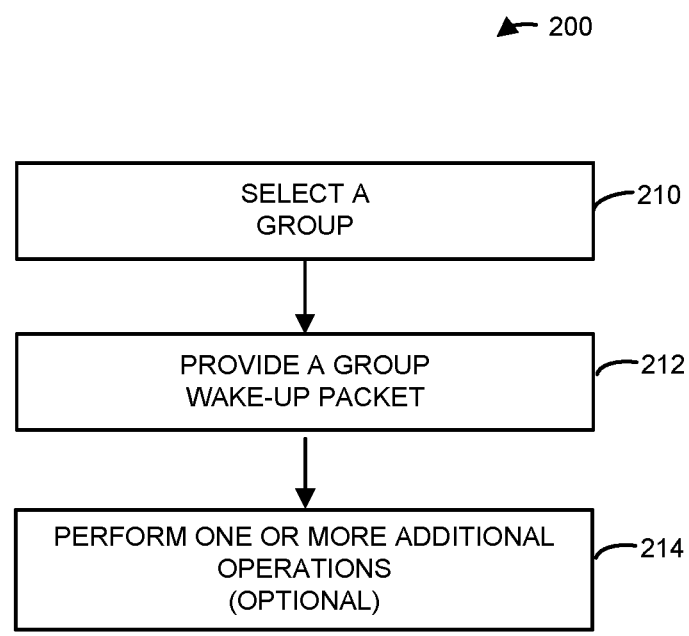
FIG. 2 is a flow diagram illustrating an example of a method for providing a group wake-up packet using one of the electronic devices in FIG. 1.

FIG. 2 presents a flow diagram illustrating an example method 200 for providing a group wake-up packet. This method may be performed by an electronic device, such as an interface circuit in access point 112 in FIG. 1. During operation, the interface circuit may select a group (operation 210) in a set of recipient electronic devices, where the group includes at least one of the recipient electronic devices. For example, the group may be selected and/or the information may be based at least in part on pending traffic for the subset.

Then, the interface circuit may provide the group wake-up packet (operation 212) for the recipient electronic devices in the group with information that specifies that a subset of the recipient electronic devices in the group transition from a low-power mode. For example, the information may include an identifier of the group and/or may include a bitmap that specifies the subset. Note that the group wake-up packet may include a LP-WUR packet. Moreover, the group wake-up packet may be compatible with an IEEE 802.11 communication protocol.

In some embodiments, the interface circuit optionally performs one or more additional operations (operation 214). For example, prior to selecting the group (operation 210), the interface circuit may define the group in the set of recipient electronic devices based at least in part on requests received from the recipient electronic devices in the group. Notably, the group may be defined based at least in part on: wake-up intervals, specified in the requests, based at least in part on a duty cycle for LP-WURs in the recipient electronic devices in the group; keep-alive intervals, specified in the requests, that maintain connections with the electronic device; and/or congestion in a wireless environment of the electronic device. Furthermore, the interface circuit may provide responses to the requests for the recipient electronic devices in the group, where a given response specifies an identifier of the group. Note that the interface circuit may dynamically define the group. Alternatively, the recipient electronic devices in the group may be static.

Additionally, the interface circuit may receive acknowledgments to the group wake-up packet that are associated the subset of recipient electronic devices in the group. Alternatively, the interface circuit may provide a trigger frame for the subset of recipient electronic devices in the group, and may receive a group acknowledgment to the group wake-up packet that is associated the subset of recipient electronic devices in the group.

Figure 3:
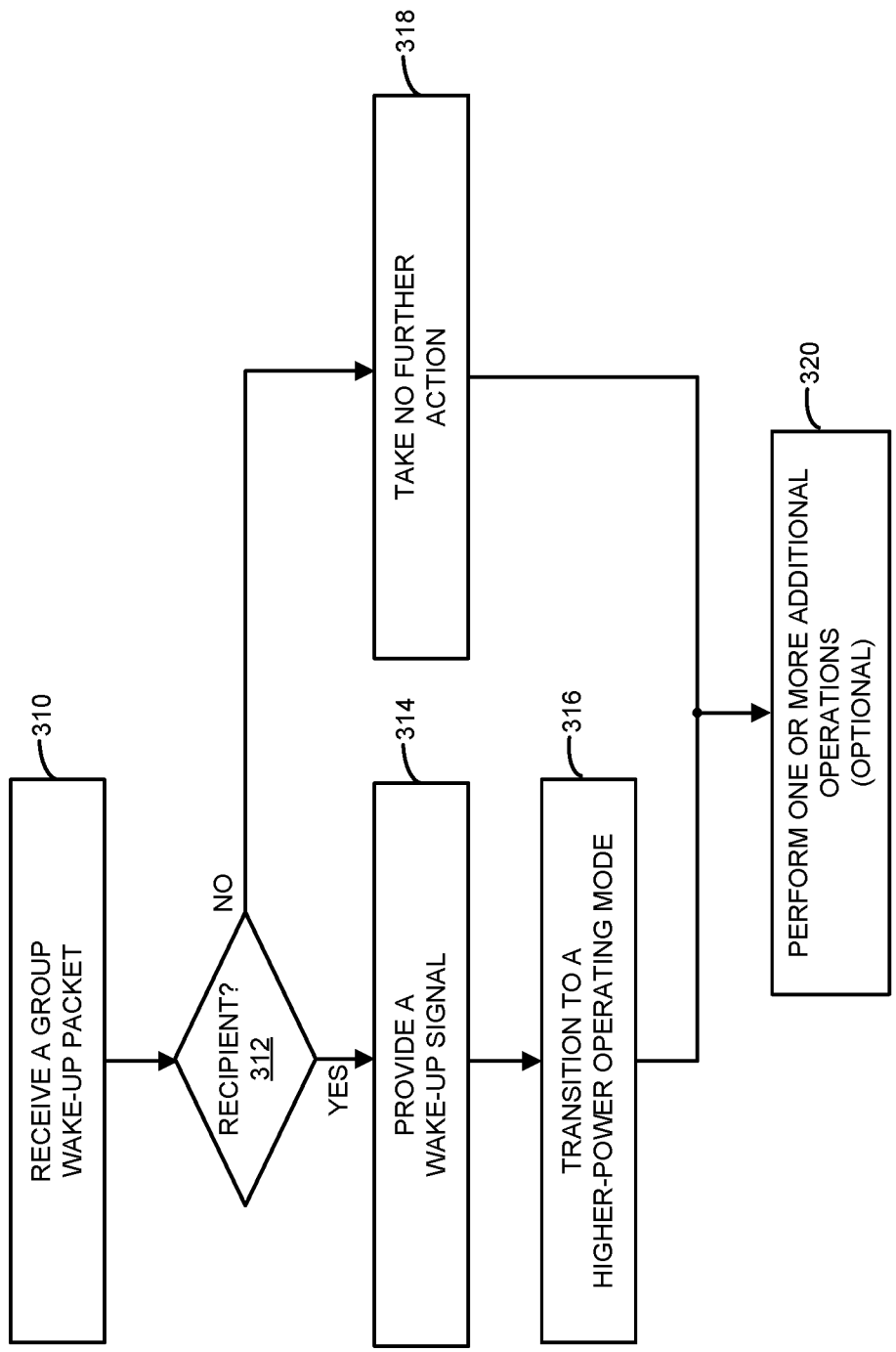
FIG. 3 is a flow diagram illustrating an example of a method for receiving a group wake-up packet using one of the electronic devices in FIG. 1.

FIG. 3 presents a flow diagram illustrating an example method 300 for receiving a group wake-up packet. This method may be performed by a recipient electronic device, such as an interface circuit in electronic device 110-1 in FIG. 1. This interface circuit may include a wake-up radio and a main radio. During operation, the wake-up radio may receive the group wake-up packet (operation 310) associated with the electronic device with the information that specifies that a subset of recipient electronic devices in a group of recipient electronic devices. When the information specifies the recipient electronic device (operation 312), the wake-up radio may provide, to the main radio, a wake-up signal (operation 314) that transitions the main radio from a low-power mode to a higher-power mode (operation 316). Alternatively, when the information does not specify the recipient electronic device (operation 312), the wake-up radio may take no further action (operation 318).

In some embodiments, the interface circuit optionally performs one or more additional operations (operation 320). For example, prior to the wake-up radio receiving the wake-up packet (operation 310), the main radio may provide a request for the electronic device with group requirements of the recipient electronic device. The group requirements may include: a wake-up interval based at least in part on a duty cycle of the wake-up radio and/or a keep-alive interval that maintains a connection with the electronic device. Furthermore, the main radio may receive a response to the request, which is associated with the electronic device. This response may specify an identifier of the group.

Furthermore, after transitioning to the higher-power mode (operation 316), the main radio may provide an acknowledgment for the electronic device to the group wake-up packet. Alternatively, after transitioning to the higher-power mode (operation 316), the main radio may receive a trigger frame for the subset of recipient electronic devices in the group, and may provide a group acknowledgment for the electronic device to the group wake-up packet, which is associated the subset of recipient electronic devices in the group.

In some embodiments of methods 200 (FIG. 2) and/or 300, there may be additional or fewer operations. Moreover, the order of the operations may be changed, and/or two or more operations may be combined into a single operation or performed at least partially in parallel.

In some embodiments, at least some of the operations in methods 200 (FIG. 2) and/or 300 are performed by an interface circuit in the electronic device. For example, at least some of the operations may be performed by firmware executed by an interface circuit, such as firmware associated with a MAC layer, as well as one or more circuits in a physical layer in the interface circuit.

Figure 4:
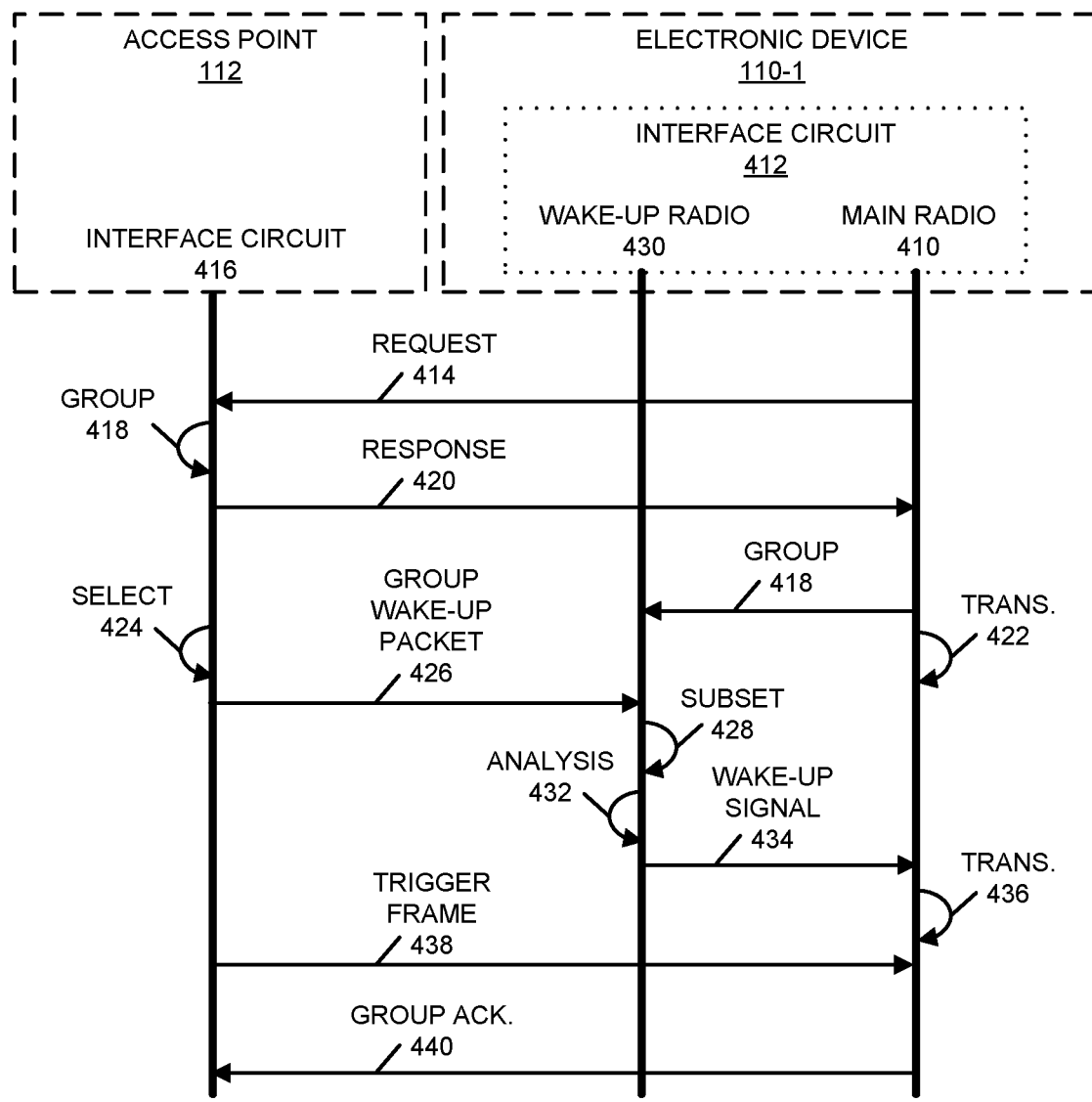
FIG. 4 is a flow diagram illustrating an example of communication between electronic devices, such as the electronic devices of FIG. 1.

The communication technique is further illustrated in FIG. 4, which presents a flow diagram illustrating an example of communication between electronic device 110-1 and access point 112. Notably, after associating with access point 112, main radio 410 in interface circuit 412 in electronic device 110-1 may transmit a request 414 with group requirements of electronic device 110-1 (such as a wake-up interval if wake-up radio 430 operates with a duty cycle and/or a keep-alive interval) to access point 112. Then, a radio in interface circuit 416 in access point 112 may receive request 414 and may define a group 418 of recipient electronic devices (which may include electronic device 110-1) based at least in part on the group requirements, congestion in a wireless environment of access point 112, etc. Moreover, interface circuit 416 may provide a response 420 that includes an identifier of group 418.

After receiving response 420, main radio 410 may provide the identifier of group 118 to wake-up radio 430 and may transition 422 to the low-power mode. While main radio 410 is in the low-power mode, wake-up radio 430 may monitor or listen for a group wake-up packet (and/or other wake-up communication) from access point 112 that specifies electronic device 110-1.

Subsequently, when interface circuit 416 receives downlink traffic for electronic device 110-1 (and/or other recipient electronic devices in group 418), interface circuit 416 may select 424 group 418. Then, interface circuit 416 may provide a group wake-up packet 426 for the recipient electronic devices in group 418 with information that specifies that a subset 428 of the recipient electronic devices in group 418 are to transition from the low-power mode to the higher-power mode.

After receiving group wake-up packet 426, wake-up radio 430 may analyze 432 the information to determine if subset 428 specifies electronic device 110-1. When subset 428 specifies electronic device 110-1, wake-up radio 430 may provide, to main radio 410, a wake-up signal 434 that transitions 436 main radio 410 from the low-power mode back to the higher-power mode. Alternatively, when subset 428 does not specify electronic device 110-1, wake-up radio 430 may take no further action.

Next, interface circuit 416 may provide a trigger frame 438 for the subset of recipient electronic devices in the group. After receiving trigger frame 438, main radio 410 may provide an acknowledgment, e.g., that is included in a group acknowledgment 440 to group wake-up packet 426 that is associated with subset 428 of recipient electronic devices in the group.

Representative Embodiments

In some embodiments of the LP-WUR radio technology, the modulation may include on-off keying (OOK) or similar modulation that has a very low data rate (such as 250 kbps). Consequently, a LP-WUR wake-up packet may consume a significant amount of medium time. For example, a relatively small packet may still require a significant amount of time to transmit when a very low data rate is used. Moreover, if there are a large number of electronic devices in a WLAN that use LP-WUR packets as a wake-up mechanism, the medium in the WLAN can become congested by these low data-rate transmissions. This congestion may degrade the communication performance, which can negatively impact user experience.

Figure 5:
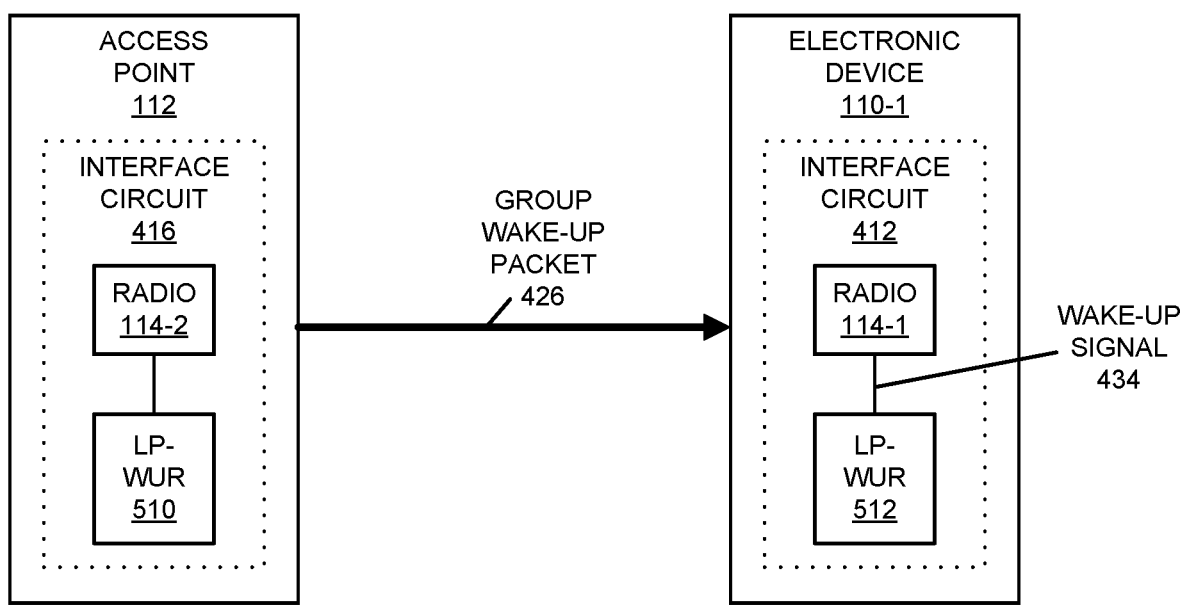
FIG. 5 is a drawing illustrating an example interface circuit in one of the electronic devices in FIG. 1.

In order to address these challenges, in the communication technique the LP-WUR packet may be used to selectively wake-up the main radio in a subset of a group of recipient electronic devices. As shown in FIG. 5, which presents a drawing illustrating an example of an interface circuit 412 in electronic device 110-1, in the communication technique a LP-WUR 512 may be a companion radio to a main (Wi-Fi) radio 114-1 in interface circuit 412. LP-WUR 512 may allow electronic device 110-1 to turn off main radio 114-1, e.g., whenever possible. Moreover, LP-WUR 512 may wake up main radio 114-1 when group wake-up packet 426 (such as an LP-WUR packet) sent from optional LP-WUR 510 or radio 114-2 in access point 112 specifies electronic device 110-1. Note that in some embodiments LP-WUR 512 is configured to receive wireless signals, while main radio 114-1 is configured to transmit and to receive wireless signals. In these ways, the power consumption of LP-WUR 512 may be very low, e.g., lower than Bluetooth Low Energy. LP-WUR 512 can operate in an always-on mode and/or in a duty-cycle mode. For example, in the duty-cycle mode, LP-WUR 512 may turn on or listen for a LP-WUR packet from access point 112 based at least in part on a wake-up interval and/or a keep-alive interval of electronic device 110-1.

Moreover, during the communication technique, an access point may group recipient electronic devices and may use a single LP-WUR packet to wake up the group of recipient electronic devices. However, the recipient electronic devices in the group may not all have traffic when the group wake-up packet is received. Consequently, the LP-WUR packet may include a group wake-up indication map (WIM) that is carried or conveyed in the LP-WUR packet. The group-WIM may be a bitmap that is used to indicate which recipient electronic devices are being awakened (such as a subset of the group of recipient electronic devices). For example, in some embodiments, if there are ten recipient electronic devices in a group, then the group-WIM may be, e.g., a 10-bit field. In other embodiments, other mapping schemes can be used.

After association with an access point, a recipient electronic device may negotiate the wake-up group to which it is assigned. In some embodiments, this wake-up group negotiation may be performed using the main radio. The negotiation may be initiated by the recipient electronic device sending a LP-WUR set-up request. The LP-WUR set-up request may include information that assists the access point in grouping the recipient electronic devices into a wake-up group. For example, the LP-WUR set-up request may include a wake-up-radio wake-up interval and/or a keep-alive interval (the interval during which the recipient electronic device expects to receive at least one frame from the access point). In response, the access point may transmit an LP-WUR set-up response. The LP-WUR set-up response may include a short identifier (the destination identifier) of the recipient electronic device, which is allocated by the access point when access point is addressing the recipient electronic device using the LP-WUR. Because of the very low data rate of the LP-WUR packet, the destination address of the recipient electronic device may not be the media access (MAC) address of the recipient electronic device (which includes 48 bits). Instead, a short identifier may be used to identify a recipient electronic device in the wake-up group. For example, the recipient electronic devices may have a particular bit order in the group-WIM. Thus, if the recipient electronic device's bit order is two, then the second bit in the group-WIM may indicate whether this recipient electronic device is being awakened. In some embodiments, the bit in the group-WIM associated with the recipient electronic device is set to '1' if the access point is waking up the recipient electronic device, and is set to '0' if the access point is not waking up the recipient electronic device. Note that the keep-alive interval may specify the interval during which the access point sends at least one LP-WUR packet to a group, such that the recipient electronic device may expect to receive at least one LP-WUR packet from the access point within the keep-alive interval.

Figure 6:
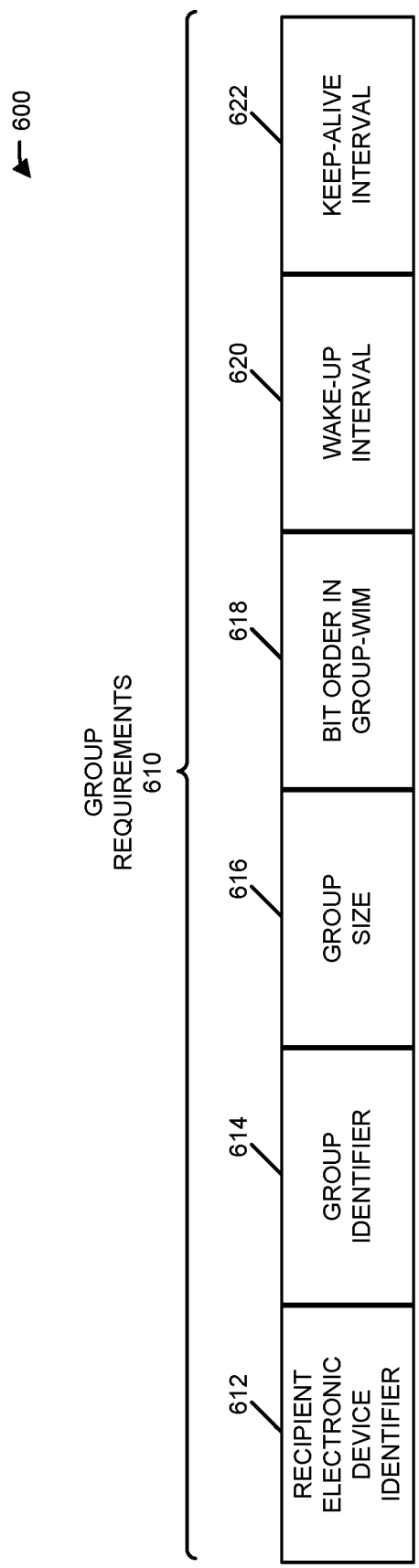
FIG. 6 is a drawing illustrating an example request packet that includes group requirements.

FIG. 6 presents a drawing illustrating an example of a request packet 600 that includes group requirements 610, including: (short) identifier 612 of the recipient electronic device (which may have fewer bits than the MAC address), group identifier 614, group size 616 or the number of recipient electronic devices in the group, the bit order of recipient electronic devices in the group-WIM 618, optional wake-up interval 620 (when the recipient electronic device uses a duty cycle for the LP-WUR) and/or keep-alive interval 622. In other embodiments, the order of items in the packet can vary and additional and/or different items can be included.

Figure 7:
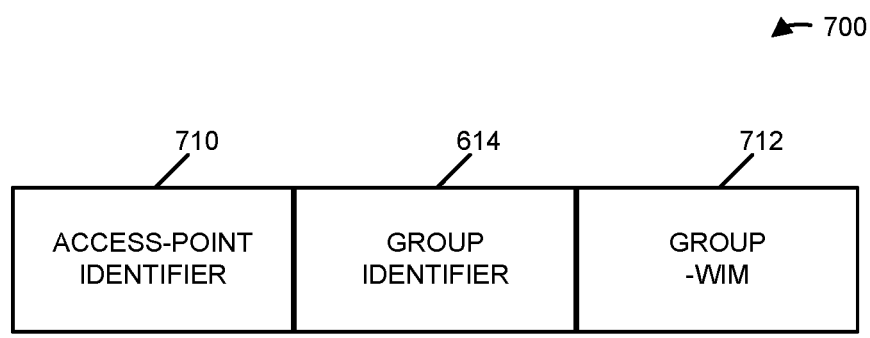
FIG. 7 is a drawing illustrating an example of a group wake-up packet.

After the LP-WUP negotiation, the recipient electronic device can turn off the main radio and may turn on the LP-WUR. Subsequently, if the access point wants to wake up one or more recipient electronic devices in a group, it may send the group wake-up packet (e.g., the LP-WUR packet). FIG. 7 presents a drawing illustrating an example of a group wake-up packet 700. This group wake-up packet includes: an access-point identifier 710 of the access point; a group identifier 614 that indicates the identifier of the group, and/or a group-WIM 712 that indicates which recipient electronic devices wake up and which do not. If a recipient electronic device's group identifier is included in the group wake-up packet and if the bit in the group-WIM indicates or specifies the recipient electronic device, then the recipient electronic device may wake up its main radio. In other embodiments, the order of items in the packet can vary and additional and/or different items can be included.

As noted previously, in some embodiments the LP-WUR operates in a duty-cycle mode. When the LP-WUR is in duty cycle mode, the wake-up group indicates the group of recipient electronic devices whose LP-WURs will wake up in response to the group wake-up packet. Note that the larger the group size is, the higher the probability that a given recipient electronic device wakes up unnecessarily. A larger group size may also lead to a longer group-WIM field. However, a larger group size reduces the number of LP- WUR packets transmitted on the medium. Consequently, the size of the group may be an optimization parameter for the WLAN.

In general, the access point may group recipient electronic devices into the wake-up groups based at least in part on one or more criteria. For example, the access point may define a group based at least in part on the congestion on the medium, such as based at least in part on the transmitted and received packets during a time interval (e.g., 5 or 10 s). Note that a congested medium may benefit from a larger wake up group. As noted previously, the wake-up interval may be specified by the recipient electronic devices in their requests. The access point may group recipient electronic devices with similar or the same wake-up interval into the same group. In some embodiments, the recipient electronic devices are arranged into a hierarchy of groups.

Note that the group identifier can be assigned at any time during the WUR negotiation, such that the group identifier can be dynamic. However, in some embodiments the group identifier is assigned using an association response, such that the group identifier is assigned in a static manner. Moreover, the group-identifier assignment may be based at least in part on grouping of MAC addresses of recipient electronic devices. Alternatively, the group-identifier assignment may be based at least in part on grouping of the association identifiers (AIDs) of the recipient electronic devices.

For example, the first four bits of a recipient electronic device's AID can be used as the group identifier. In other words, recipient electronic devices whose AIDs have the same four most significant bits may be grouped into the same group. The number of AIDs bits that are used as the group identifier may be announced in operating parameters from the access point, such as the block-address operation element that may be included in a beacon or association response. In this case, when a recipient electronic device receives a group wake-up packet, it may try to match the four most significant bits of its AID to the group identifier contained in the group wake-up packet in order to decide if this group wake-up packet is intended for it. More generally, recipient electronic devices may be defined into groups based, at least in part, on portions of their identifiers. Thus, three most significant bits may define a group identifier, while the remaining least significant bits may be the identifiers of the stations in a group.

Figure 8:
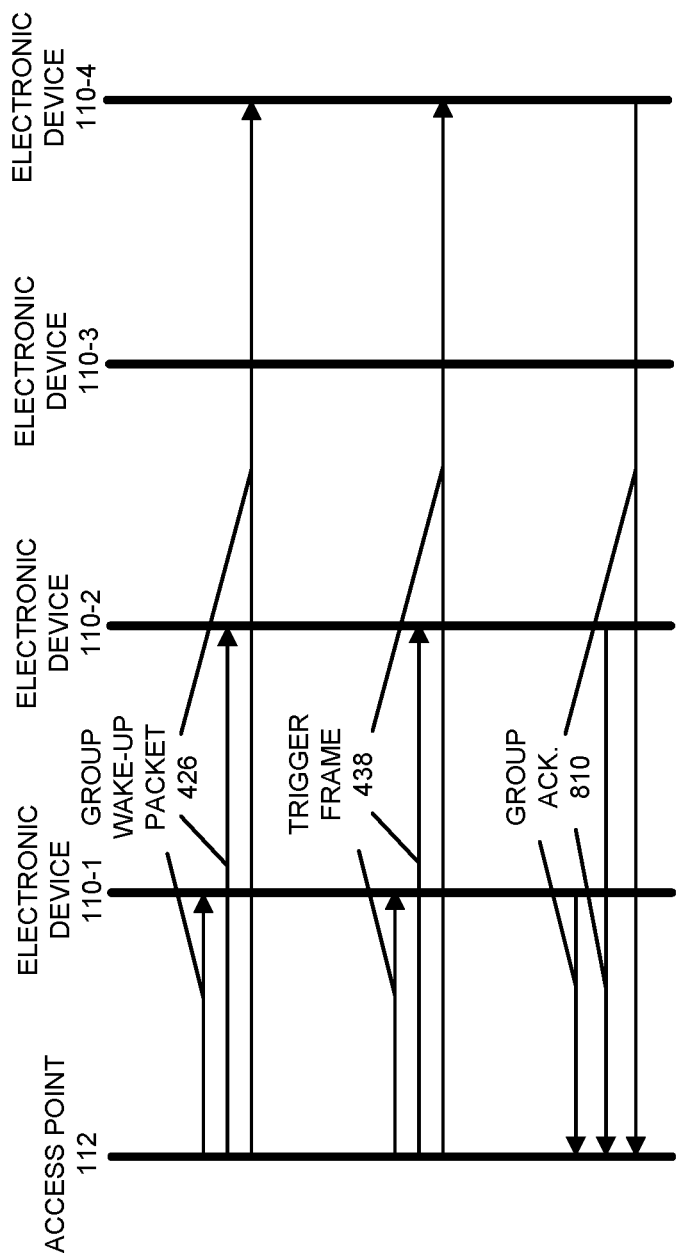
FIG. 8 is a drawing illustrating an example of a group acknowledgment to a group wake-up packet.

When an access point sends a group wake-up packet to a recipient electronic device, the access point may need to receive acknowledgment from the recipient electronic device in order to know whether the recipient electronic device received the group wake-up packet, and consequently whether the access point can send traffic to the recipient electronic device over the main radio. In general, any subsequent frames or packets sent by the recipient electronic device may serve as an acknowledgment. In order to reduce the contention of the multiple recipient electronic devices sending acknowledgments at the same time, the access point may use an IEEE 802.11ax trigger frame to solicit simultaneous acknowledgment. For example, as shown in FIG. 8, which presents a drawing illustrating an example of a group acknowledgment to a group wake-up packet, access point 112 may form a wake-up group for electronic devices 110. In the wake-up group, only electronic devices 110-1, 110-2 and 110-4 may be awakened by group wake-up packet 426. Then, access point 112 may send trigger frame 438 to electronic devices 110-1, 110-2 and 110-4 to collect acknowledgments from them, such as group acknowledgments 810. (While group acknowledgments 810 are illustrated as being temporally distinct in FIG. 8, in some embodiments they may occur concurrent, such as via OFDMA.) Note that if one of electronic devices 110-1, 110-2 and 110-4 does not provide an acknowledgment, access point 112 may send a unicast message to this electronic device. If an acknowledgment is still not received, access point 112 may resend the group wake-up packet.

In summary, a group wake-up packet and the group-WIM may be used to allow recipient electronic devices to be grouped and selectively transitioned to the higher-power mode in response to a group wake-up packet. An access point may form groups with different sizes. Moreover, the group-WIM may be a bitmap with a length equal to the group size. Each bit in the Group-WIM may indicate whether a main radio in a particular recipient electronic device is to transition to the higher-power mode. Furthermore, recipient electronic devices can be grouped in a static or a dynamic manner. For example, recipient electronic devices may be grouped based at least in part on the MAC addresses or AID values. Note that the group wake-up packet may serve as a keep-alive signal and a keep-alive interval may be proposed to inform a recipient electronic device of the presence of the access point. In some embodiments, in order to improve network efficiency, an IEEE 802.11ax trigger frame is used to collect the acknowledgments to the group wake-up packet after the group wake-up packet transmissions.

We now describe embodiments of an electronic device. FIG. 9 presents a block diagram of an example of an electronic device 900 (which may be a cellular telephone, an access point, another electronic device, etc.) in accordance with some embodiments. This electronic device includes processing subsystem 910, memory subsystem 912, and networking subsystem 914. Processing subsystem 910 includes one or more devices configured to perform computational operations. For example, processing subsystem 910 can include one or more microprocessors, application-specific integrated circuits (ASICs), graphics processing units (GPUs), microcontrollers, programmable-logic devices, and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), a read-only memory (ROM), flash memory, and/or other types of memory. In some embodiments, instructions for processing subsystem 910 in memory subsystem 912 include: program instructions or sets of instructions (such as program instructions 922 or operating system 924), which may be executed by processing subsystem 910. For example, a ROM can store programs, utilities or processes to be executed in a non-volatile manner, and DRAM can provide volatile data storage, and may store instructions related to the operation of electronic device 900. Note that the one or more computer programs may constitute a computer-program mechanism, a computer-readable storage medium or software. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910. In some embodiments, the one or more computer programs are distributed over a network-coupled computer system so that the one or more computer programs are stored and executed in a distributed manner.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Figure 9:
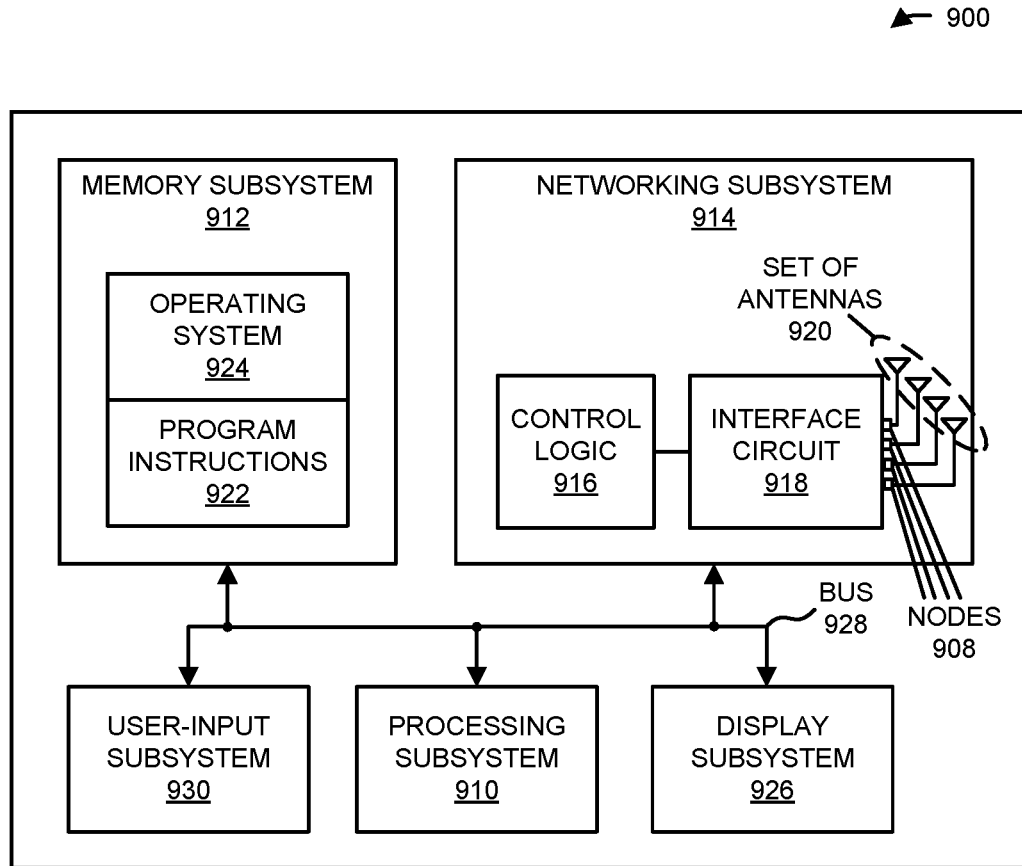
FIG. 9 is a block diagram illustrating an example of one of the electronic devices of FIG. 1.

Networking subsystem 914 includes one or more devices configured to couple to and communicate on a wired and/or wireless network (i.e., to perform network operations), including: control logic 916, an interface circuit 918 and a set of antennas 920 (or antenna elements) in an adaptive array that can be selectively turned on and/or off by control logic 916 to create a variety of optional antenna patterns or 'beam patterns.' (While FIG. 9 includes set of antennas 920, in some embodiments electronic device 900 includes one or more nodes, such as nodes 908, e.g., a pad, which can be coupled to set of antennas 920. Thus, electronic device 900 may or may not include set of antennas 920.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 914 includes one or more radios, such as a wake-up radio that is used to receive group wake-up packets, and a main radio that is used to transmit and/or receive frames or packets during a higher-power mode. The wake-up radio and the main radio may be implemented separately (such as using discrete components or separate integrated circuits) or in a common integrated circuit.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices.

Within electronic device 900, processing subsystem 910, memory subsystem 912, and networking subsystem 914 are coupled together using bus 928 that facilitates data transfer between these components. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc. Display subsystem 926 may be controlled by processing subsystem 910 to display information to a user (e.g., information relating to incoming, outgoing, or an active communication session).

Electronic device 900 can also include a user-input subsystem 930 that allows a user of the electronic device 900 to interact with electronic device 900. For example, user-input subsystem 930 can take a variety of forms, such as: a button, keypad, dial, touch screen, audio input interface, visual/image capture input interface, input in the form of sensor data, etc.

Electronic device 900 can be (or can be included in) any electronic device with at least one network interface. For example, electronic device 900 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 914. This integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 922, operating system 924 (such as a driver for interface circuit 918) or in firmware in interface circuit 918. Alternatively or additionally, at least some of the operations in the communication technique may be implemented in a physical layer, such as hardware in interface circuit 918. In some embodiments, the communication technique is implemented, at least in part, in a MAC layer and/or in a physical layer in interface circuit 918.

While examples of numerical values are provided in the preceding discussion, in other embodiments different numerical values are used. Consequently, the numerical values provided are not intended to be limiting.

While the preceding embodiments illustrated the use of a group wake-up packet that is communicated using Wi-Fi, in other embodiments of the communication technique Bluetooth Low Energy is used to communicate the wake-up packet. Furthermore, the group wake-up packet may be communicated in the same or a different band of frequencies that the band(s) of frequencies used by the main radio. For example, the group wake-up packet may be communicated in one or more bands of frequencies, including: 900 MHz, 2.4 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A recipient electronic device, comprising:
   a node configured to communicatively couple to an antenna; and
   an interface circuit, communicatively coupled to the node, configured to communicate with an electronic device, wherein the interface circuit comprises a wake-up radio and a main radio, and wherein the wake-up radio is configured to:
      receive, from the node, a group wake-up packet associated with the electronic device, the group wake-up packet comprising information that specifies a subset of recipient electronic devices in a group of recipient electronic devices, wherein the group of recipient electronic devices comprises two or more recipient electronic devices and the group is based at least in part on one or more group requirements comprising at least one of: a wake-up interval based at least in part on a duty cycle of the wake-up radio or a keep-alive interval associated with maintaining a connection with the electronic device; and
      when the information specifies the recipient electronic device, provide, to the main radio, a wake-up signal that transitions the main radio from a low-power mode to a higher-power mode.

2. The recipient electronic device of claim 1, wherein the electronic device comprises an access point.

3. The recipient electronic device of claim 1, wherein the information comprises a bitmap that specifies the subset.

4. The recipient electronic device of claim 1, wherein the information comprises an identifier of the group.

5. The recipient electronic device of claim 4, wherein the group identifier is based at least in part on a portion of an association identifier of the recipient electronic device.

6. The recipient electronic device of claim 1, wherein the wake-up radio is further configured to take no action when the information does not specify the recipient electronic device.

7. The recipient electronic device of claim 1, wherein the group wake-up packet comprises a Low Power Wake Up Radio (LP-WUR) packet.

8. The recipient electronic device of claim 1, wherein the main radio is configured to provide, to the node, a request for the electronic device with the group requirements of the recipient electronic device.

9. The recipient electronic device of claim 8, wherein the main radio is further configured to receive, from the node, a response to the request, which is associated with the electronic device.

10. The recipient electronic device of claim 9, wherein the response specifies an identifier of the group.

11. The recipient electronic device of claim 10, wherein, after transitioning to the higher-power mode, the main radio is configured to provide, to the node, an acknowledgment for the electronic device to the group wake-up packet.

12. The recipient electronic device of claim 10, wherein, after transitioning to the higher-power mode, the main radio is configured to:
receive, from the node, a trigger frame for the subset of recipient electronic devices in the group; and
provide, to the node, a group acknowledgment for the electronic device to the group wake-up packet, which is associated the subset of recipient electronic devices in the group.

13. A non-transitory computer-readable storage medium for use in conjunction with a recipient electronic device, the computer-readable storage medium storing program instructions that, when executed by the recipient electronic device, cause the recipient electronic device to receive a group wake-up packet by carrying out one or more operations comprising:
receiving, using a wake-up radio in the recipient electronic device, a group wake-up packet associated with an electronic device, the group wake-up packet comprising information that specifies a subset of recipient electronic devices in a group of recipient electronic devices, wherein the group of recipient electronic devices comprises two or more recipient electronic devices, and the group is based at least in part on one or more group requirements comprising at least one of: a wake-up interval based at least in part on a duty cycle of the wake-up radio or a keep-alive interval associated with maintaining a connection with the electronic device; and
when the information specifies the recipient electronic device, providing a wake-up signal that transitions a main radio in the recipient electronic device from a low-power mode to a higher-power mode.

14. The computer-readable storage medium of claim 13, wherein the one or more operations comprise taking no action when the information does not specify the recipient electronic device.

15. The computer-readable storage medium of claim 13, wherein the one or more operations comprise providing a request for the electronic device with the one or more group requirements of the recipient electronic device.

16. The computer-readable storage medium of claim 13, wherein the one or more operations comprise receiving a response to the request, which is associated with the electronic device; and
wherein the response specifies an identifier of the group.

17. A method for receiving a group wake-up packet, comprising:
by a recipient electronic device:
receiving, using a wake-up radio in the recipient electronic device, a group wake-up packet associated with an electronic device, the group wake-up packet comprising information that specifies a subset of recipient electronic devices in a group of recipient electronic devices, wherein the group of recipient electronic devices comprises two or more recipient electronic device and the group is based at least in part on one or more group requirements comprising at least one of: a wake-up interval based at least in part on a duty cycle of the wake-up radio or a keep-alive interval associated with maintaining a connection with the electronic device; and
when the information specifies the recipient electronic device, providing a wake-up signal that transitions a main radio in the recipient electronic device from a low-power mode to a higher-power mode.

18. The method of claim 17, wherein the method comprises providing a request for the electronic device with the one or more group requirements of the recipient electronic device.

19. The method of claim 17, wherein the information comprises a bitmap that specifies the subset.

20. The method of claim 17, wherein the method comprises allowing the radio to remain in a low-power mode when the information does not specify the recipient electronic device.

* * * * *